United States Patent
Enebakk et al.

(10) Patent No.: US 7,879,130 B2
(45) Date of Patent: Feb. 1, 2011

(54) CALCIUM-SILICATE BASED SLAG FOR TREATMENT OF MOLTEN SILICON

(75) Inventors: Erik Enebakk, Kristiansand (NO); Gabriella Maria Tranell, Trondheim (NO); Ragnar Tronstrad, Kristiansand (NO)

(73) Assignee: Elkem ASA, Oslo (NO)

( * ) Notice: Subject to any disclaimer, the term of this patent is extended or adjusted under 35 U.S.C. 154(b) by 0 days.

(21) Appl. No.: 12/041,373

(22) Filed: Mar. 3, 2008

(65) Prior Publication Data

US 2008/0156145 A1     Jul. 3, 2008

Related U.S. Application Data

(62) Division of application No. 10/515,583, filed as application No. PCT/NO03/00091 on Mar. 17, 2003.

(30) Foreign Application Priority Data

May 22, 2002   (NO) .................................. 20022409

(51) Int. Cl.
   *C22B 61/00*   (2006.01)
(52) U.S. Cl. .......................................... 75/303; 75/392
(58) Field of Classification Search ................... 75/309; 423/348
   See application file for complete search history.

(56) References Cited

U.S. PATENT DOCUMENTS

| 3,711,278 A | | 1/1973 | Josefsson |
| 3,871,872 A | | 3/1975 | Downing et al. |
| 4,151,264 A | | 4/1979 | More et al. |
| 4,457,903 A | | 7/1984 | Dietl et al. |
| 4,515,600 A | | 5/1985 | Dietl et al. |
| 4,534,791 A | * | 8/1985 | More et al. ................. 75/10.47 |
| 4,837,376 A | * | 6/1989 | Schwirtlich et al. ......... 423/348 |
| 5,788,945 A | | 8/1998 | Schei |
| 6,368,403 B1 | | 4/2002 | Schmid et al. |

FOREIGN PATENT DOCUMENTS

| EP | 0002135 | 5/1979 |
| GB | 2116956 A | 10/1983 |
| NO | 980139 | 1/1998 |
| WO | WO9703922 | 2/1997 |

* cited by examiner

*Primary Examiner*—Roy King
*Assistant Examiner*—Jie Yang

(57) ABSTRACT

The present invention relates to a calcium-silicate based slag having a phosphorous content of less than 3 ppmw. The invention further relates to a method for producing a low phosphorous calcium-silicate based slag, where molten calcium-silicate based slag is treated with a molten ferrosilicon alloy in a vessel, whereby phosphorous in the calcium-silicate based slag is transferred to the ferrosilicon alloy, and a low phosphorous calcium-silicate to based slag is removed from the vessel.

9 Claims, No Drawings

CALCIUM-SILICATE BASED SLAG FOR TREATMENT OF MOLTEN SILICON

RELATED APPLICATION

This application is a divisional application of the U.S. application Ser. No. 10/515,583, which is a 371 of PCT/NO03/00091.

FIELD OF INVENTION

The present invention relates to a calcium-silicate based slag having a very low phosphorous content, a method for producing such calcium-silicate based slag having a very low phosphorous content, and to the use of the calcium-silicate based slag for the removal of boron and phosphorous from molten silicon.

BACKGROUND ART

In the method of refining metallurgical grade silicon in order to produce pure silicon for solar cell production (solar grade silicon) it is known to remove boron by treatment of molten silicon with a calcium-silicate based slag. Such a method is disclosed in U.S. Pat. No. 5,788,945. In order to remove boron from silicon to an acceptable low level it is necessary to use a slag having a low boron content.

For solar grade silicon there is also strict requirements to the content of phosphorous. Thus the phosphorous content of solar grade silicon should be less than 3 ppmw.

The slag treatment of silicon in order to remove boron also influences the phosphorous content of silicon. Thus the distribution coefficient between phosphorous in slag and phosphorous in silicon is very low and in the range between 0.1 and 0.3. If calcium-silicate based slag used to remove boron from silicon contains too much phosphorous, the phosphorous content of silicon can therefore be increased during the slag treatment. It is thus important to use a low phosphorous containing calcium-silicate based slag for removal of boron from silicon.

When preparing phosphorous containing calcium-silicate based slag from CaO and $SiO_2$ it is difficult to find a CaO source having a sufficiently low phosphorous content. In order not to increase the phosphorous content of silicon during slag treatment the calcium-silicate based slag, the phosphorous content of the calcium-silicate based slag should be as low as possible and preferably well below 3 ppmw.

DISCLOSURE OF INVENTION

It is an object of the present invention to provide a calcium-silicate based slag having a very low phosphorous content and a method for removing phosphorous from calcium-silicate based slag where low cost sources of CaO and $SiO_2$ can be used to produce the slag.

Thus, according to a first aspect the present invention relates to a calcium-silicate based slag for treatment of molten silicon, said slag having a phosphorous content of less than 3 ppmw.

According to a preferred embodiment the calcium-silicate based slag has a phosphorous content below 1 ppmw.

According to a preferred embodiment the calcium-silicate based slag contains $CaF_2$ and/or MgO in an amount of up to 30% by weight in order to lower the viscosity of the slag and to increase removal of phosphorous and boron from silicon.

According to another preferred embodiment the calcium-silicate based slag contains one or more of $BaF_2$, BaO, LiF and $Li_2O$ in an amount of up to 10% by weight in order to adjust the density of the slag to facilitate removal of the slag from silicon after slag treatment.

According to yet another preferred embodiment the calcium-silicate based slag contains $Al_2O_3$ in order to be able to adjust the aluminum content of silicon to be treated with the slag.

According to a second aspect the present invention relates to a method for producing a low phosphorous calcium-silicate based slag, which method is characterized in that molten calcium-silicate based slag is treated with a molten ferrosilicon alloy in a vessel whereby phosphorous in the calcium-silicate based slag is transferred to the ferrosilicon alloy, and separating the molten low phosphorous calcium-silicate based slag from the molten ferrosilicon alloy.

According to a preferred embodiment a molten layer of a ferrosilicon alloy is s provided in the vessel, whereafter a $SiO_2$ source, a CaO source are supplied to the top of the layer of ferrosilicon alloy to provide a layer of molten calcium silicate based slag whereby phosphorous in the calcium-silicate based slag is transferred to the ferrosilicon alloy, and removing the low phosphorous calcium-silicate based slag from the vessel.

Preferably the ferrosilicon alloy comprises up to 30% by weight silicon, the remaining being iron except for normal amounts of impurities. More preferably the ferrosilicon alloy comprises 10-20% by weight silicon. The amount of silicon in the ferrosilicon alloy should balance the amount of SiO02 in the liquid calcium-silicate based slag in order to prevent silicon in the slag from entering the ferrosilicon alloy and thus changing the composition of the slag.

According to another embodiment, the molten ferrosilicon alloy can be produced in situ by adding Fe203 and Si together with the slag forming compounds $SiO_2$ and CaO. Upon heating Fe203 will be reduced to Fe by some of the Si added and form the ferrosilicon alloy. In this embodiment the amount of SiO2 supplied may have to be adjusted in order to compensate for the amount of SiO02 produced when Fe203 is reduced by Si, in order to obtain a suitable final composition of the calcium-silicate based slag.

In order to increase the speed of reaction between the molten calcium-silicate based slag and the molten ferrosilicon alloy a reducing and/or an inert gas or a mixture of such gases are supplied to the vessel in order to stir the layers of molten ferrosilicon and liquid calcium-silicate based slag. Typically, carbon monoxide and hydrogen are supplied as reducing gases and argon and nitrogen are supplied as inert gases By the method of the present invention it has surprisingly been found that practically 100% of the phosphorous in the calcium-silicate based slag is transferred to the ferrosilicon alloy. Further, only a small amount of iron is being transferred from the ferrosilicon alloy to the calcium-silicate based slag.

By the method of the present invention it is thus possible to produce a calcium-silicate based slag having a phosphorous content of below 1 ppmw from a calcium-silicate slag which initially at least 30 ppmw phosphorous Cheap sources of lime and quarts can thus be used to provide a high quality calcium-silicate based slag which is excellent for the removal of boron and phosphorous from molten silicon.

In one embodiment the calcium-silicate based slag treated for removal of phosphorous is slag which has been used for slag treatment of molten silicon and thus has an increased content of phosphorous. In this way calcium-silicate based slag from treatment of molten silicon can be regenerated and recycled thus strongly reducing the costs for slag treatment of molten silicon and avoiding disposal of large volumes of used calcium-silicate based slag.

The method of the present invention can be carried out in conventional high temperature furnaces such as induction furnaces and arc furnaces.

In a preferred embodiment it is used an arc furnace having vertical electrodes and equipped with a lower tapping hole near its bottom and an upper tapping hole at a higher level. The process is started by establishing a layer of molten ferrosilicon alloy at the bottom of the furnace, where the top of the layer of ferrosilicon is well below the upper tapping hole. Thereafter slag forming compounds or used slag for regeneration is added until a layer of molten slag extending a distance above the upper tapping hole is formed. When the supply of slag forming compounds is finished, the molten layer of slag is allowed to stay in the furnace for a predetermined period to ensure removal of phosphorous from the slag and into the ferrosilicon alloy. The upper tapping hole is then opened and the slag above the tapping hole is being tapped from the furnace. After tapping, the upper tapping hole is closed and further slag forming compounds are supplied to the furnace. When the phosphorous content in the ferrosilicon alloy has increased to a preset value, the ferrosilicon alloy is tapped from the lower tapping hole and the above described process is repeated. In this way it is obtained a semi-continuous, low cost production of low phosphorous calcium-silicate based slag.

The present invention also relates to the use of the slag produced according to the method of the present invention for removal of boron and phosphorous from molten silicon.

DETAILED DESCRIPTION OF INVENTION

EXAMPLE 1

A layer of molten ferrosilicon alloy consisting of 85% by weight Fe and 15% by weight Si was provided at the bottom of an induction furnace. 120 grams of quarts having a phosphorous content of 4 ppmw and 130 grams of lime having a phosphorous content of 35 ppm were added to the induction furnace and melted on the top of the molten ferrosilicon layer. The initial phosphorous content of the liquid slag was calculated to 20 ppmw based on the phosphorous content of quarts and lime.

Three tests were run using different gas compositions for stirring the melt. The stirring gas was supplied through a graphite tube. After treatment the slag was tapped from the induction furnace and analysed with respect to phosphorous, boron, CaO, $SiO_2$ and $Fe_2O3$. The results are shown in Table 1.

TABLE 1

| Test No. | Stirring gas | P* [ppmw] | B [ppmw] | Chemical Analysis | | |
|---|---|---|---|---|---|---|
| | | | | CaO [wt %] | $SiO_2$ [wt %] | $Fe_2O_3$ [wt %] |
| A | Ar—5% $H_2$ | <2.5 | 8.1 | 53.44 | 46.48 | 0.12 |
| B | Ar—25% CO | <2.5 | 8.4 | 53.36 | 46.55 | <0.12 |
| C | Ar | <2.5 | 8.1 | 53.01 | 47.60 | 0.12 |

*detection limit for P in slag: 2.5 ppmw (ICP)

The results in Table 1 show that the phosphorous content in the produced slags was below the detection limit of 2.5 ppm for all three slags. Based on calculations of mass balances from use of the produced slags in slag treatment of molten silicon, it was found that the phosphorous content of the three slags produced in fact was about 0.1 ppmw. Further, Table 1 shows that the content of Fe203 in the three slags was very low, indicating that only a minor amount of iron was transferred from the ferrosilicon alloy to the slag phase.

EXAMPLE 2

The three slags A, B and C produced in Example 1 were used to remove boron and phosphorous from molten silicon. Molten metallurgical grade silicon containing 47 ppmw boron, 9 ppmw phosphorous and 0.25% by weight of iron was treated with the slags A, B and C produced in Example 1. The weight ratio of slag to silicon was 2.6 for all runs. The content of phosphorous, boron and iron in the used slags and in the treated silicon were analysed.

The results are shown in Table 2.

TABLE 2

| Slag | Pppmw | | Bppmw | | Fe % by weight |
|---|---|---|---|---|---|
| | in slag | in Si | in slag | in Si | In Si |
| A | 2.5 * | 3 | 25.5 | 8.6 | 0.4 |
| B | 2.5 * | 4 | 25.1 | 8.5 | 0.4 |
| C | 2.5 * | 4 | 25.7 | 8.5 | 0.4 |

* detection limit for P in slag: 2.5 ppmw (ICP)

From the results in Table 2 it can be seen that a very good boron removal was obtained for all three slags and that the phosphorous content in the treated silicon was reduced from 9 to about 4 ppmw.

The invention claimed is:

1. A method for producing a low phosphorous calcium-silicate based slag comprising the steps of:
    (a) providing a layer of molten ferrosilicon alloy in a vessel;
    (b) forming a layer of molten calcium-silicate based slag on top of the layer of molten ferrosilicon alloy in the vessel;
    (c) stirring said layer of molten ferrosilicon alloy and layer of molten calcium-silicate based slag by supplying a reducing and/or an inert gas to the vessel, whereby phosphorous in the layer of molten calcium-silicate based slag is transferred to the layer of molten ferrosilicon alloy and a molten low phosphorous calcium-silicate based slag having a phosphorous content of less than 3 ppmw is produced;
    (d) removing molten low phosphorous calcium-silicate based slag containing less than 3 ppmw phosphorous from the vessel;
    (e) maintaining the layer of molten ferrosilicon alloy in the vessel; and
    (f) repeating steps (b)-(e) to produce low phosphorous calcium-silicate based slag having a phosphorous content of less than 3 ppmw.

2. The method according to claim 1, wherein the layer of molten calcium-silicate based slag in step (b) is produced in situ in the vessel by adding a $SiO_2$ source and a CaO source to the top of the layer of ferrosilicon alloy.

3. The method according to claim 1, wherein the layer of molten ferrosilicon alloys in step (a) is produced in situ in the vessel by adding $Fe_2O_3$ and Si together with the calcium-silicate based slag.

4. The method according to claim 1, wherein the ferrosilicon alloy contains up to 30% by weight of silicon, the remainder, except for normal impurities, being iron.

5. The method according to claim 4, wherein the ferrosilicon alloy contains 10 to 20% by weight of silicon.

6. The method according to claim 1, wherein the calcium-silicate based slag supplied to the vessel in step (b) is used calcium-silicate based slag which has been used for slag treatment of molten silicon.

7. The method according to claim 1, wherein carbon monoxide and hydrogen are supplied as reducing gases.

8. The method according to claim 7, wherein argon and nitrogen are supplied as inert gases.

9. A method for producing a low phosphorous calcium-silicate based slag comprising the steps of:
   (a) forming a layer of molten ferrosilicon alloy in an arc furnace having vertical electrodes, the furnace having a lower tap hole, and an upper top hole, the layer of molten ferrosilicon alloy being below the upper tap hole;
   (b) forming a layer of molten calcium-silicate based slag on top of the layer of molten ferrosilicon alloy in the furnace, the layer of molten calcium-silicate based slag extending above the upper top hole;
   (c) maintaining the layer of molten calcium-silicate based slag and the layer of molten ferrosilicon alloy in the furnace for a predetermined period of time to transfer phosphorous from the layer of molten calcium-silicate based slag to the layer of molten ferrosilicon alloy and produce a layer of molten low phosphorous calcium-silicate based slag having a phosphorous content of less than 3 ppmw;
   (d) tapping the layer of molten low phosphorous calcium-silicate based slag from the furnace through the upper tap hole;
   (e) maintaining the layer of molten ferrosilicon alloy in the furnace; and
   (f) repeating steps (b)-(e), to produce low phosphorous calcium-silicate based slag having a phosphorous content of less than 3 ppmw.

* * * * *